April 17, 1956 B. H. CRAFT, SR 2,742,211
FISHING POLE HOLDER
Filed Sept. 24, 1954 2 Sheets-Sheet 1
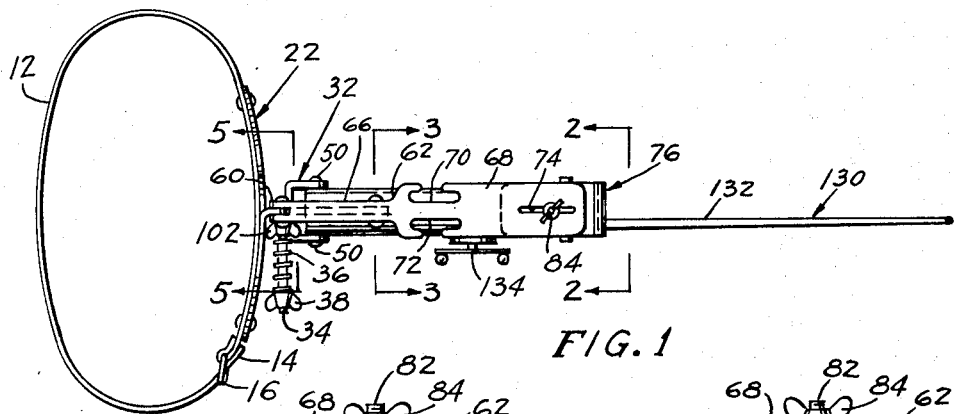
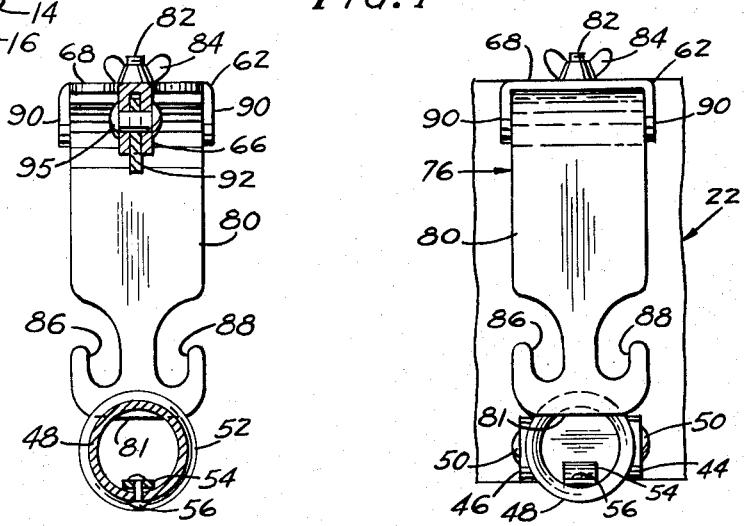
FIG. 3     FIG. 2
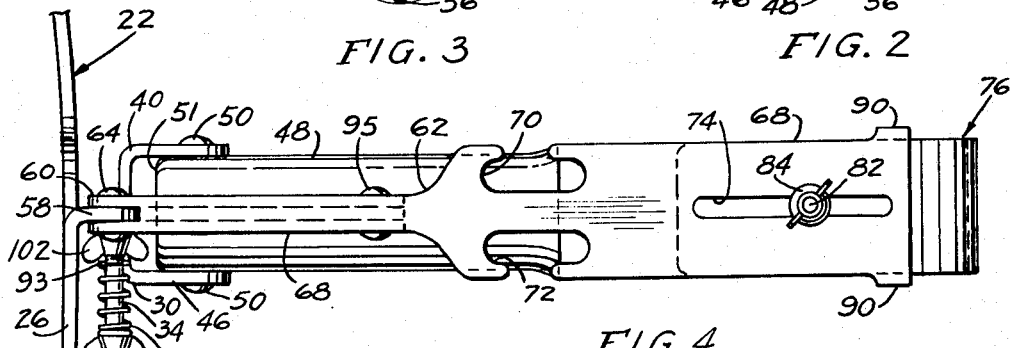
FIG. 4
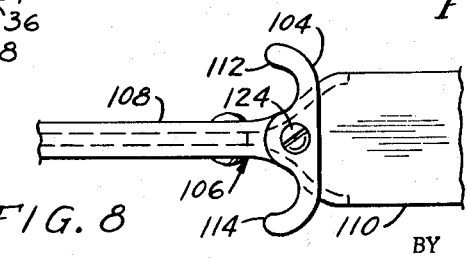
FIG. 8
BELMONT H. CRAFT, SR.
INVENTOR
BY
McMorrow, Berman & Davidson
ATTORNEYS

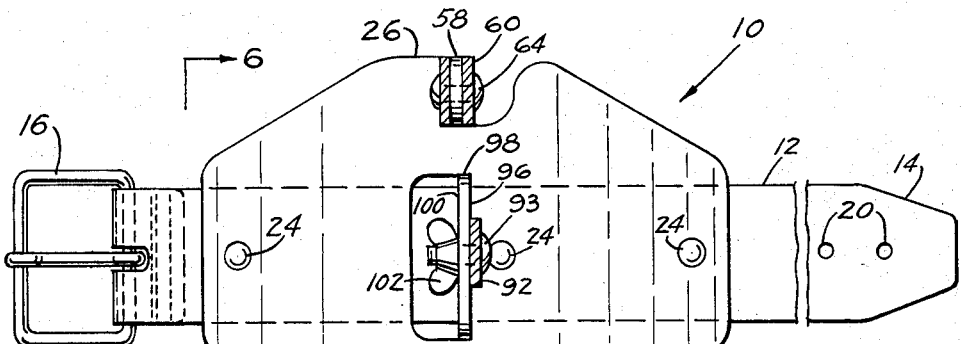

United States Patent Office 2,742,211
Patented Apr. 17, 1956

2,742,211

FISHING POLE HOLDER

Belmont H. Craft, Sr., Atlanta, Ga.

Application September 24, 1954, Serial No. 458,111

4 Claims. (Cl. 224—5)

This invention relates to fishing apparatus and more particularly to a fishing pole holder of the body supported type.

It is an object of this invention to provide a fishing pole holder of the body supported type in which the fishing pole may be retained therein at any desired angle of inclination, and which may be readily adjustable to varying angles of inclination through substantially a ninety degree arc.

Another and important object of this invention is to provide a fishing pole holder of the body supported type in which the fishing pole may be retained at the desired angle of inclination while leaving the hands of the fisherman free, or permitting the fisherman to employ one hand to steady the pole or rod while employing the other hand to operate the usual reel associated with the pole or rod.

Yet another object of this invention is to provide a fishing pole holder which will have a universal application to most types of fishing poles or rods regardless of the size of the handle, and wherein the handle will be resiliently maintained in the holder with the pole at the selected angle of inclination.

Still another object of this invention is to provide a fishing pole holder in which the pole or rod retained thereby can be readily moved from a given angle of inclination used for fishing to an almost vertical position to permit unhooking of the fish caught on the hook of the rod or pole and at the same time retaining the fishing pole or rod in this position to leave the hands of the fisherman free to manipulate the hook from the mouth of the fish caught thereon.

Another and still further object of this invention is to provide a fishing pole holder of the body supported type which is light in weight, efficient in operation and constructed in a simple yet rugged manner so as to be usable over extended periods of time without repair or replacement.

Other objects and advantages will become apparent from the following detailed description, forming the specification, and taken in conjunction with the accompanying drawings, in which:

Figure 1 is a top plan view of the fishing pole holder embodying this invention;

Figure 2 is a front elevational view as seen along line 2—2 of Figure 1 and looking in the direction of the arrows;

Figure 3 is a transverse sectional view taken substantially along the line 3—3 of Figure 1 and looking in the direction of the arrows;

Figure 4 is a top plan view shown on a somewhat enlarged scale and in which the body encircling belt is omitted and the base plate secured thereto shown fragmentarily;

Figure 5 is a transverse sectional view taken substantially on line 5—5 of Figure 1 and looking in the direction of the arrows;

Figure 6 is a side elevational view, partially in section, as taken substantially along line 6—6 of Figure 5 and looking in the direction of the arrows;

Figure 7 is a top plan view of the socket member and its operative connecting means as taken substantially along line 7—7 of Figure 6 and looking in the direction of the arrows;

Figure 8 is a partial top plan view of the hanger element of the holder showing a modified form thereof; and Figure 9 is a view in side elevation, and shown fragmentarily, of the hanger element of a modified form and used in conjunction with the modification as shown in Figure 8.

With continued reference to the drawings, there is shown a fishing pole holder, generally indicated at 10, adapted to be supported upon the body of a user by a flexible belt 12 having a tongue end 14 and a cooperating buckle 16 at its other end so that the belt may be tightened about the body of the user in the usual manner by inserting the tongue 14 through the buckle 16 and having the hook 18 of the buckle engage in a selected one of the row of longitudinally spaced openings 20 provided in the belt adjacent the tongue.

A generally octagonal base plate, generally indicated at 22, is carried by the belt 12 intermediate the ends of the belt but more closely adjacent the end carrying the buckle 16 with the longitudinal axis of the base plate being disposed along the longitudinal axis of the belt, and the plate may be secured by any suitable means such as the rivets 24. The base plate 22 may be considered to have an upper edge 26 and a lower edge 28.

A tongue 29 struck up from the base plate 22 along the lower edge 28 so as to extend outwardly therefrom and substantially perpendicularly thereto. One Z-shaped arm 30 of a support yoke, generally indicated at 32, has one end thereof secured to the tongue 29 by a bolt 34 passing through registering transverse openings through the one end of the arm 30 and the tongue 29 and extending therebeyond. A spring 36 surrounds the shank of the bolt 34 and extends between the face of the tongue 29 remote from the face engaged by the one end of the arm 30, and at its other end the spring 36 is retained on the bolt by a wing nut 38 so that selective resilient pressure may be placed upon the pivotal connection afforded by the bolt between the arm 30 and the tongue 29.

An L-shaped arm 40 forms the other part of the yoke 32 and has one leg 42 fixedly secured to the intermediate portion of the arm 30 so that the other leg 44 extends in spaced parallel relation to the other extending portion 46 of the arm 30 remote from the end portion thereof pivotally carried by the tongue 29.

The lower end of a hollow, tubular fishing pole handle receiving socket 48 is disposed between the spaced parallel legs 44 and 46 of the yoke 32 and secured therebetween as by rivets 50 passing transversely therethrough and through the legs 44 and 46 of the yoke. The socket 48 is open at both ends with the outer end 52 being flared while the inner end remote therefrom and received in the yoke 32 may be crimped. An arcuately formed leaf spring 54 is disposed within the socket 48 intermediate its ends and secured to the inner surface of the socket at one end as by a rivet 56.

Thus, it will be seen that the socket 48 is carried by the base plate 22 for movement in an arcuate path in a substantially vertical plane about an axis lying parallel to the longitudinal axis of the plate. The socket 48 is adapted to receive in its outer flared end 52, the handle of a fishing pole to be supported by the holder 10. Since it is desirable to provide a fishing pole handle receiving socket which may accommodate a fishing pole handle of various sizes, the socket will be of somewhat greater diameter than the diameter of the usual handle or grip portion of a fishing pole and the leaf spring 54 will engage the outer surface of the fishing pole handle as it is inserted into the socket so as to provide a resilient pressure thereagainst assisting in maintaining the fishing pole handle within the socket 48. The flared outer end 52 will provide a guide surface for ease of entry of the fishing pole handle into the socket while the opposite inner end 51, being crimped will provide a stop for the end face of the fishing pole handle received in the socket.

The tongue 58, similar to the tongue 29 is struck upwardly from the base plate 22 along the upper edge 26 so as to extend outwardly therefrom and perpendicularly thereto and to the same side of the base plate as the tongue 29. The tongue 58 is received in the forked end 60 of an elongated support arm 62 and is pivotally secured thereto as by a rivet 64 passing through suitably aligned and registering openings in the spaced parallel legs of the forked end 60 and the tongue 58 extending therebetween.

Thus, the support arm 62 is carried by the base plate 22 for movement in a substantially vertical arcuate path about an axis which lies parallel to the longitudinal axis of the base plate 22 and parallel to the axis about which the socket 48 moves in its vertical path.

The support arm 62 has an inner portion 66 which has its longer dimension disposed perpendicularly to the longitudinal axis of the base plate 22 and in which the forked end 60 is provided. Joined to the inner portion 66 at the end thereof remote from the forked end 60, and integrally formed therewith is the outer portion 68 of the support arm 62. The outer portion 68 is disposed with its longer dimension at right angles to the longer dimension of the inner portion 66, as clearly seen in Figure 3.

A pair of spaced, longitudinally extending slots 70 and 72 are provided in the outer portion 68 adjacent its juncture with the inner portion 66 with each of the slots opening to opposite longitudinal side edges of the outer portion 68. An elongated, closed slot 74 is provided in the outer portion 68 adjacent the end thereof remote from the end merging with the inner portion 66.

A carrier, generally indicated at 76, one straight leg 78 of which is disposed beneath the flat outer portion 68 of the arm 62 and has its other leg 80 depending therefrom forwardly of the free end 69 of the support arm 62, the legs 78 and 80 being joined together by an integrally formed arcuate section 82 so that the leg 80 is disposed substantially normal to the leg 78.

The leg 78 carries a bolt 82' passing upwardly therethrough in a suitably formed aperture transversely formed therein and centrally between the sides thereof with the shank of the bolt 82' being received in the closed adjusting slot 74, and the dependent leg 80 of the carrier thereby being selectively placed in a position forwardly of the free end 69 of the support arm by sliding the leg 78 along the guide slot 74 and then securing the carrier by a wing nut 84 threadingly carried on the shank of the bolt 82' being tightened on against the outer surface of the outer portion of the support arm upon the bolt 82'.

Adjacent the free end 81 of the depending leg 80, there is formed a pair of spaced hooks 86 and 88 which extend longitudinally of the leg 80 and open to opposite sides thereof. Also, it will be noted that the carrier 76 extends outwardly of the support arm 69 at the free end thereof through a pair of depending guide ears 90 formed at opposite sides of the outer portion 68 of the support arm adjacent the free end 69 thereof.

Pivotally secured to the support arm 62 on its inner portion 66 adjacent the juncture with the outer portion 68 is an adjusting link 92 which extends downwardly and obliquely therefrom toward the base plate 22 and carries adjacent its end remote from its pivotal connection to the support arm, a bolt 93 to be received in an elongated, closed guide slot 94 formed in the laterally extending flange 96 of a bracket 98 having its base 100 secured to the outer surface of the base plate 22 and disposed with its longitudinal center line along the transverse axis of the base plate and centrally between the upper and lower edges 26 and 28. A wing bolt 102 is carried by the threaded shank portion of the bolt 93 carried by the adjusting link 92 so that the support arm 62 may thereby be secured in a selected position in its arcuate path of movement about the axis defined by the rivet 64 to thus dispose the hooks 86 and 88 at a selected position with respect to the socket 48 since the carrier 76 will move with the support arm 62.

It will be noted that the base plate 22 is somewhat arcuately formed so as to comfortably conform to the body contour of the user adjacent his waist with the base plate having its support arm 62 and socket 48 extending outwardly therefrom with respect to the body of the user upon which the holder 10 is to be supported.

From the foregoing structure, it will be apparent that the holder 10 is adapted to have the handle of a fishing pole received in the flared end 52 of the socket 48 so as to project outwardly therefrom with the handle being resiliently maintained within the handle by engagement with the leaf spring 54. The socket 48 may be moved in its arcuate path to any desired angular relation with respect to the substantially vertical disposition of the plate 22 so that the pole may project at the desired angle outwardly therefrom.

With the socket and pole disposed at the desired angle, the support arm 62 may then be moved in its arcuate path so that the rod portion of the pole forwardly of the handle may be supportingly engaged in one of the hooks 86 or 88 of the carrier 76. This will leave the hands of the user free while the fishing pole will be supported upon his body at the desired angle.

In the event that the user or fisherman has hooked a fish on the supported pole, the pole may be then raised to a substantially vertical position by moving the socket 48 in its arcuate path toward the support arm 62, and then having the rod or shank portion of the pole engaged in one of the retaining slots 70 or 72 whereby the pole will be supported without the necessity of use of either hand by the user or fisherman and the fisherman may then disengage the fish from the hook after he has reeled in.

It will be understood, that the fisherman may, if he so desires, use one hand to steady and guide the fishing pole carried in the holder 10 while the line is in the water, however, he is free to let go of the pole without disturbing its angular inclination, and further may use both hands to assist in operating the reel during the reeling-in operation, if he so desires.

In Figure 8, the retaining slots 70 and 72 are omitted and a hook 104 is mounted on the upper surface of a modified form of a support arm, generally indicated at 106 adjacent the juncture of the inner portion 108 with the outer portion 110. Thus, the hook 104 has two arcuately formed retaining ears 112 and 114. The retaining ears 112 and 114 extend toward the base plate 22 and are formed at opposite ends of the hook 104 so that the fishing pole carried by the holder 10 may be supported in a substantially vertical position.

The modified form of the supporting arm 106 has its inner end portion forked in the same manner as the supporting arm 62 and is mounted on the base plate 22 for movement in a substantially vertical arcuate path. The support arm 106 is twisted intermediate its ends, as at 116 and is arcuately formed to define a carrier 118 the free end 120 of which is disposed below the straight inner portion 108 of the support arm. Similarly to the carrier 76, the carrier 118 is provided with a pair of fishing pole retaining slots 122 adjacent the free end 120 thereof whereby the shank or rod portion of a fishing pole may be supportingly received therein.

The hook 104 may be secured to the upper surface of the support arm 106, intermediate the ends of the arm, as by a screw 124.

The material from which the holder 10 is to be made, is preferably a light weight metal such as aluminum, although materials suitable for this purpose may be employed.

With further reference to the respective inner portions 66 and 108 of the support arms 62 and 106, it will be seen that each of these portions are formed of substantially U-shaped cross section so as to receive one end of the adjusting link 92 therebetween to be pivotally secured therebetween by the rivet 95.

As clearly shown in Figure 1, the handle of a fishing pole, generally indicated at 130, may be received in the socket 48 and extend outwardly therefrom at any desired angle with the rod or shank portion 132 being supportingly engaged in one of the retaining hooks 86 or 88 of the carrier 76, so that the reel 134 will extend to one side thereof and its operation not be interfered with by the structure of the holder 10.

Also, as shown in Figure 1, the reel 134 illustrated therein is of the right hand type, however, if the user is left handed, it will be apparent that the reel 134 will extend to the opposite side of the socket and supporting arm with the shank or rod portion thereof resting in the retaining hook 88 rather than the retaining hook 86 when the fishing pole is to be maintained by the holder in a selected angular position. The same will be true of the use of the retaining slots 70 and 72 or retaining ears 112 and 114 whereby one will be used with right handed reels and the other with those of the left handed type.

While there are shown and described the preferred embodiment of the invention, it is to be understood that the structure is susceptible to change and modification within the practicability of the invention and therefore should be limited only by the scope of the claims appended hereto.

What is claimed is:

1. A fishing pole holder comprising a base plate having upper and lower edges and adapted to be supported on the person of the user, a fishing pole handle socket carried by said base plate adjacent its lower edge for movement in a substantially vertical arcuate path, an elongated arm carried by said plate adjacent its upper edge for movement in an arcuate path about an axis parallel to the axis about which said socket moves, and a carrier carried by said arm adjacent its free end for movement therewith, said socket adapted to receive the handle end of a fishing pole therein and said carrier adapted to engage the pole intermediate its ends whereby said pole can be supported on said holder, means carried by said arm intermediate its ends and operatively connected to said base plate for securing said arm in a selected position in its arcuate path.

2. A fishing pole holder comprising a base plate having upper and lower edges and adapted to be supported on the person of the user, a fishing pole handle socket carried by said base plate adjacent its lower edge for movement in a substantially vertical arcuate path, an elongated arm carried by said plate adjacent its upper edge for movement in an arcuate path about an axis parallel to the axis about which said socket moves, and a carrier carried by said arm adjacent its free end for movement therewith, said socket adapted to receive the handle end of a fishing pole therein and said carrier adapted to engage the pole intermediate its ends whereby said pole can be supported on said holder, an adjusting link pivotally carried adjacent one end by said arm and movable therewith, a bracket carried by said base plate intermediate its ends, said bracket having an upstanding flange extending laterally from said base plate, said flange having an elongated slot longitudinally thereof, means carried by said adjusting link adjacent the other end thereof slidably received in said slot and adapted to secure said other end of said link on the bracket flange in a selected position longitudinally of said slot to thereby secure said support arm in a selected position in its arcuate path.

3. A fishing pole holder comprising a base plate having upper and lower edges and adapted to be supported on the person of the user, a fishing pole handle socket carried by said base plate adjacent its lower edge for movement in a substantially vertical arcuate path, an elongated arm carried by said plate adjacent its upper edge for movement in an arcuate path about an axis parallel to the axis about which said socket moves, and a carrier carried by said arm adjacent its free end for movement therewith, said socket adapted to receive the handle end of a fishing pole therein and said carrier adapted to engage the pole intermediate its ends whereby said pole can be supported on said holder, means adjustably securing said carrier to said arm whereby said carrier can be selectively moved longitudinally of said arm and secured in a selected position of longitudinal adjustment, and means carried by said arm intermediate its end and operatively connected to said base plate for securing said arm in a selected position in its arcuate path to dispose the pole in desired angular relation with respect to the base plate while the pole is engaged in said carrier moved to its selectively adjusted position.

4. A fishing pole holder comprising a base plate having upper and lower edges and adapted to be supported on the person of the user, a fishing pole handle socket carried by said base plate adjacent its lower edge for movement in a substantially vertical arcuate path, an elongated arm carried by said plate adjacent its upper edge for movement in an arcuate path about an axis parallel to the axis about which said socket moves, and a carrier carried by said arm adjacent its free end for movement therewith, said socket adapted to receive the handle end of a fishing pole therein and said carrier adapted to engage the pole intermediate its ends whereby said pole can be supported on said holder, means adjustably securing said carrier to said arm whereby said carrier can be selectively moved longitudinally of said arm and secured in a selected position of longitudinal adjustment, a pair of spaced guide ears dependingly carried by said arm adjacent the free end thereof between which said carrier will pass when adjusted longitudinally of said arm.

References Cited in the file of this patent
UNITED STATES PATENTS

| 988,485 | Mitchell | Apr. 4, 1911 |
| 2,085,984 | Kruithof | July 6, 1937 |
| 2,576,624 | Miller | Nov. 27, 1951 |

FOREIGN PATENTS

| 10,333 | Great Britain | July 15, 1915 |